United States Patent [19]
Nemiroff et al.

[11] Patent Number: 6,137,837
[45] Date of Patent: Oct. 24, 2000

[54] MOTION ESTIMATION FOR DIGITAL VIDEO WITH REDUCED NUMBER OF SEARCH WINDOW PIXELS

[75] Inventors: Robert Nemiroff; Vicky B. Kaku, both of San Diego, Calif.

[73] Assignees: Motorola, Inc., Schaumburg, Ill.; General Instrument Corporation, Horsham, Pa.

[21] Appl. No.: 09/012,815

[22] Filed: Jan. 23, 1998

[51] Int. Cl.[7] .................................................. H04N 7/36
[52] U.S. Cl. .............................. 375/240.16; 348/416.1; 348/699
[58] Field of Search ................................. 348/384, 390, 348/400, 401, 402, 409, 415, 416, 420, 699, 700; 382/232, 236, 238; 375/240, 240.01, 240.12, 240.16, 240.17

[56] References Cited

U.S. PATENT DOCUMENTS

| 4,356,555 | 10/1982 | Ejiri et al. ................................ 382/254 |
| 5,210,605 | 5/1993 | Zaccarin et al. ........................ 348/416 |
| 5,276,513 | 1/1994 | van der Wal et al. .................. 348/416 |
| 5,398,068 | 3/1995 | Liu et al. ................................ 348/416 |
| 5,598,217 | 1/1997 | Yamaguchi ............................. 348/424 |
| 5,644,361 | 7/1997 | Ran et al. ............................... 348/416 |
| 5,867,221 | 2/1999 | Pullen .................................... 348/417 |
| 5,878,166 | 3/1999 | Legall .................................... 348/420 |
| 5,901,248 | 4/1999 | Fandrianto ............................. 382/236 |
| 5,982,910 | 11/1999 | Drexler .................................. 348/699 |
| 5,987,178 | 11/1999 | Anesko .................................. 348/699 |
| 6,020,926 | 2/2000 | Astle ...................................... 348/699 |

*Primary Examiner*—Bryan Tung
*Attorney, Agent, or Firm*—Barry R. Lipsitz; Ralph F. Hoppin

[57] ABSTRACT

A method and apparatus for efficient motion estimation of a digital video image wherein memory capacity and processing requirements are reduced by 50% or more, and image quality is maintained. Only a portion of the pixel data of a search window is used to perform motion estimation. Specifically, a portion of the pixel data of a previous image is retrieved and stored in a memory according to a search window pattern such as a fixed checkerboard pattern. Pixel data from the current image is alternated between first and second inverse checkerboard patterns for successive comparison regions of the search window. The scheme is compatible with frame or field mode video sequences.

14 Claims, 13 Drawing Sheets

FIG. 14

FIELD 1 SEARCH WINDOW
FIELD 2 SEARCH WINDOW

FIG. 15

MOTION ESTIMATION FOR DIGITAL VIDEO WITH REDUCED NUMBER OF SEARCH WINDOW PIXELS

BACKGROUND OF THE INVENTION

The present invention relates to a method and apparatus for efficient motion estimation of a digital video image wherein memory capacity and processing requirements are reduced. The invention is suitable for use in coding compressed digital video images such as those conforming to the MPEG-2 standard.

Digital transmission of television signals can deliver video and audio services of much higher quality than previous analog techniques. Digital transmission schemes are particularly advantageous for signals that are broadcast by satellite to cable television affiliates and/or directly to home satellite television receivers. Such signals can also be transmitted via a cable television network. Additionally, with the development of digital video storage media such as Digital Video Disks (DVDs), consumers now have the capability to store and retrieve compressed digital video in their homes.

Video compression techniques enable the efficient transmission and storage of digital video signals. Such techniques use compression algorithms that take advantage of the correlation among adjacent pixels in order to derive a more efficient representation of the important information in a video signal. The most powerful compression systems not only take advantage of spatial correlation, but can also utilize similarities among adjacent frames to further compact the data. In such systems, differential encoding is used to transmit only the difference between an actual frame and a prediction of the actual frame. The prediction is based on information derived from a previous frame of the same video sequence.

In motion compensation systems, motion vectors are derived by comparing a portion (i.e., macroblock) of pixel data from a current frame to similar portions of the previous frame. The previous frame in transmission order can be either previous or subsequent in display order. A motion estimator determines how the corresponding motion vector in the previous frame should be adjusted in order to be used in the current field. Such systems are very effective in reducing the amount of data to be transmitted.

However, conventional motion estimation techniques are very computational- and memory-intensive. For example, a 16×16 pixel macroblock in a frame which is currently being coded may be compared to a 128×96 or 128×64 search window of a previous or subsequent frame to determine which 16×16 pixel comparison region (e.g., block) in the search window most closely matches the macroblock. The criteria for the best match may be defined for each comparison region by summing the absolute values of the pixel differences, or the square of the pixel differences, for each region, and selecting the region with the lowest error.

Thus, sufficient memory is required to store the data for every pixel in the current macroblock and the search region. Furthermore, 16×16=256 difference calculations must be made for each comparison region, with 128×64=8,192 different comparison regions, for a total of 256×8192=2,097,152 difference and accumulation calculations per macroblock. Additionally, with 1,350 macroblocks per frame with the NTSC video standard (e.g., 45×30 macroblocks), for example, it can be seen that the processing and memory storage requirements can become very burdensome. This is incompatible with the opposing requirement to provide low-cost video compression hardware, in particular, for consumer applications.

Various schemes have been developed to attempt to reduce the processing and memory storage requirements of motion estimation circuitry. For example, it is possible to reduce the size of the search window. However, this may reduce coding efficiency and/or reduce image quality, in particular for fast motion scenes, where it is likely that the best match region is outside the reduced search window. Alternatively, hierarchical schemes adaptively vary the size of the current macroblock to find the macroblock size which results in the least amount of data being transmitted. However, such multi-pass adaptive schemes have high processing and memory storage requirements.

Additionally, subsampling and averaging schemes may be used to effectively reduce the size of the current macroblock or search window, but this can reduce image quality due to the lost pixel information. Moreover, further computations are required.

Accordingly, it would be desirable to provide a motion estimation system with reduced computational and memory storage requirements. The system should be compatible with both frame (e.g., progressive) and field (e.g., interlaced) mode digital video. The system should reduce computational and memory storage requirements while also maintaining a satisfactory video image. The system should further be compatible with existing video compression techniques such as those conforming to the MPEG-2 standard.

The system should reduce the amount of pixel data from a current macroblock which is used for motion estimation, as well as reducing the amount of pixel data from a search window which is used for motion estimation. The required computations and memory storage capacity should be reduced by up to 50% or more.

The present invention provides a system having the above and other advantages.

SUMMARY OF THE INVENTION

The present invention relates to a method and apparatus for efficient motion estimation of a digital video image wherein memory capacity and processing requirements are reduced. Only a portion of the pixel data of a search window is required to perform motion estimation.

A method is disclosed for performing motion estimation of a current video image using a search window of another video image, where the current video image has a first defined number of pixels, and the search window encompasses a region which can accommodate a second defined number of pixels, at most. The method comprises the steps of retrieving a reduced number of pixels from the region to form the search window according to a search window pattern, where the reduced number is less than the second defined number, and comparing a reduced number of pixels of the current video image which is less than the first defined number to different comparison regions of the search window according to a current image pattern to obtain corresponding error values.

The current image pattern, which corresponds to the search window pattern, is alternated between first and second patterns for successive comparison regions while the search window pattern is fixed. The second pattern may be an inverse image of the first pattern.

The search window pattern may comprise a fixed checkerboard pattern while the current image pattern is alternated between first and second checkerboard patterns for successive comparison regions, where the second checkerboard pattern is defined as an inverse image of the first checkerboard pattern.

The current video image may comprise a field mode image with first and second fields, in which case the search window is formed for the first field using alternate rows of the search window pattern. The search window pattern may comprise a fixed checkerboard pattern while the current image pattern comprises a checkerboard pattern which is alternated between first and second patterns for successive comparison regions, where the second checkerboard pattern is defined according to the first checkerboard pattern, and the search window for the first field comprises columns of pixels.

A corresponding apparatus is also presented.

BRIEF DESCRIPTION OF THE DRAWINGS

FIG. 14 illustrates motion estimation for field mode video in accordance with the present invention.

FIG. 15 illustrates motion estimation with the pixel pattern of FIG. 14.

DETAILED DESCRIPTION OF THE INVENTION

The present invention relates to a method and apparatus for efficient motion estimation of a digital video image wherein memory capacity and processing requirements are reduced.

Figure 1:
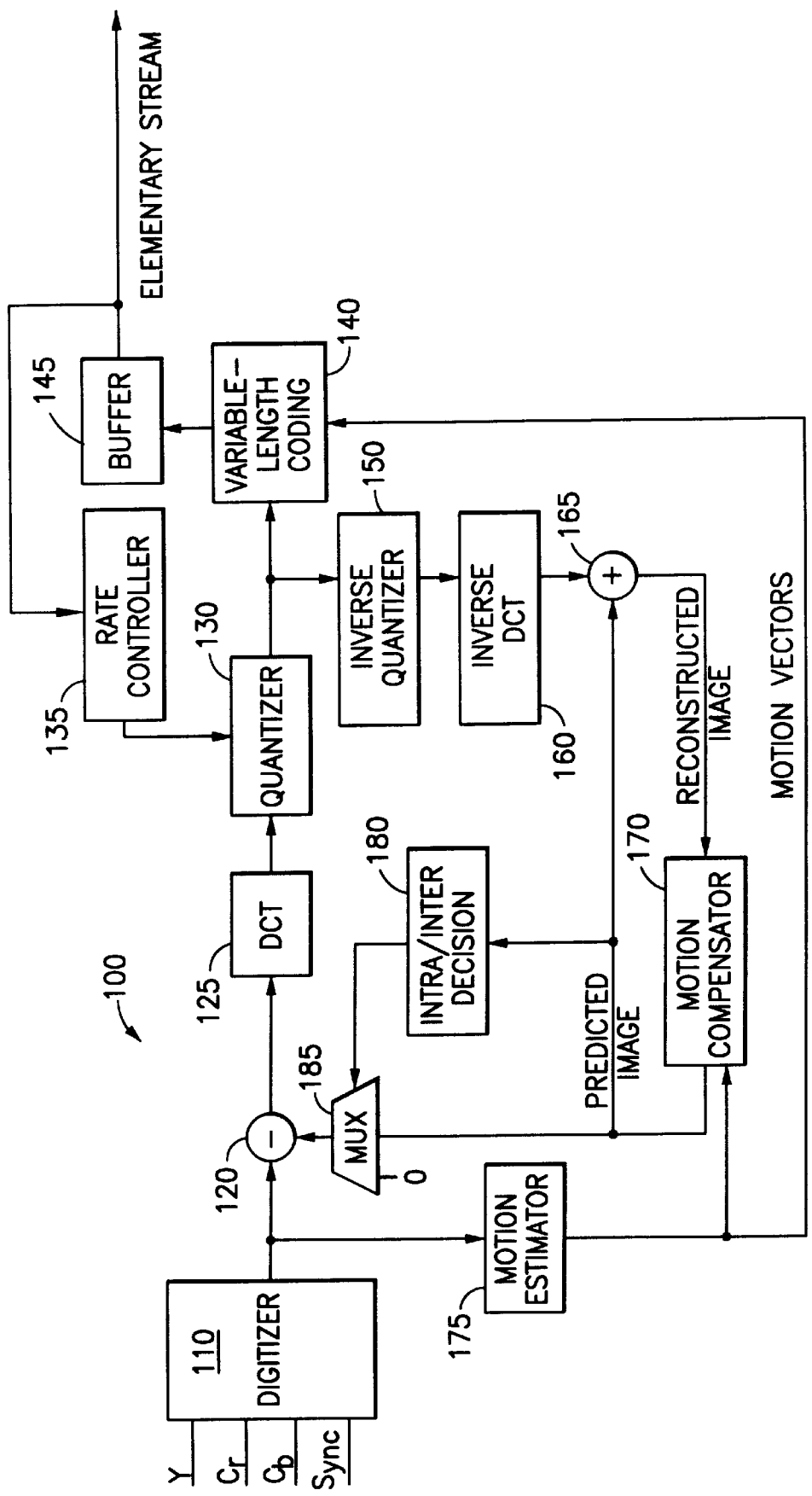
FIG. 1 illustrates a digital video compression circuit in accordance with the present invention.

FIG. 1 illustrates a digital video compression circuit in accordance with the present invention. The compression circuit 100 includes a digitizer 110 which samples an input video signal, including a luminance signal (Y), and two color difference signals (Cr, Cb). An input sync signal is used for obtaining a sampling clock. For example, the sampling clock rate for the Society of Motion Picture and Television Engineers (SMPTE) 125M specification 29.97 Hz video is 27 MHz.

At a subtractor 120, the digitized signal of a current image such as a current frame is subtracted from a predicted image from a previous or subsequent frame for inter-frame coding. For intra-frame coding, a zero value is received from a multiplexer 185.

For inter-frame coding, a differential signal is obtained which allows the current frame to be reconstructed at a decoder. A Discrete Cosine Transform (DCT) function 125 takes 8×8 arrays of differential pixel magnitudes and converts them to frequency components. A quantizer 130 quantizes the frequency components, typically allocating more bits for low frequency components which are more visible to the human eye, while allocating fewer or even zero bits for the high frequency components. The quantizer receives information from a rate controller 135 to determine the bit allocation.

The quantized frequency components are variable length coded at a coding function 140, then stored in a buffer 145, if required, to provide an elementary stream which is transmitted to a decoder. The current image is reconstructed by reversing the steps of the DCT 125 and quantizer 130 in an inverse quantizer 150 and inverse DCT function 160, respectively. The differential current image in the pixel domain which is output from the inverse DCT 160 is summed with the predicted image at an adder 165 to obtain the reconstructed current image.

The reconstructed image essentially corresponds to the image which will be reconstructed at the decoders. It should closely correspond to the input image at the digitizer, although some information may be lost due to the quantization.

The reconstructed current image is then provided to a motion compensator 170 to produce the predicted image using motion vectors from a motion estimator 175. The motion estimator 175 searches a search window of a previously coded image to find a region (e.g., best match region or block) which most closely matches the current image. A motion vector, which is represented by x and y components in pixel lengths, defines the best-match region of the search area for each macroblock in the current image. The circuitry of the motion estimator 175 is typically the most computationally intensive element in the circuit 100.

The predicted image is also provided to an intra/inter decision function 180 which determines whether inter-frame or intra-frame coding of the current macroblock should be used. A corresponding control signal is sent to the multiplexer 185.

Figure 2:
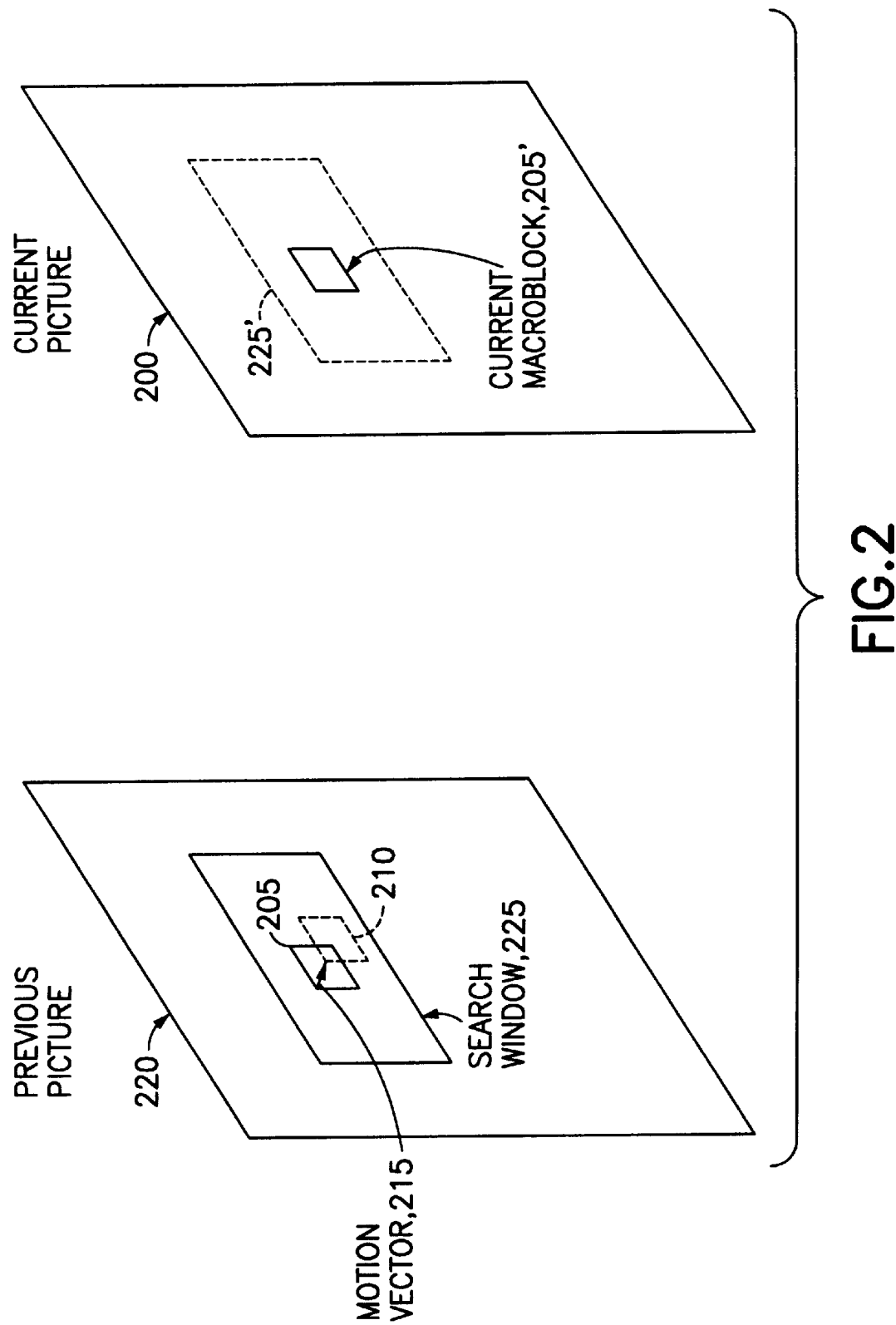
FIG. 2 illustrates motion estimation in accordance with the present invention.

FIG. 2 illustrates motion estimation in accordance with the present invention. A current picture 200, also referred to as a reference picture, typically includes a plurality of macroblocks, including a macroblock 205, also referred to as a reference macroblock or block. A previous picture 220 is a picture which was coded before the current picture, e.g., in transmission order. However, the previous picture 220 may be either before or after the current picture in display order.

The previous picture 220 includes a search window 225. A 128×64 search window, for example, actually encompasses (128+16)×(64+16) pixels due to the height and width of the current macroblock. Other search window sizes may be used, of course. The search window is typically rectangular since horizontal motion is more probable than vertical motion in most video sequences. Thus, for a 16×16 macroblock such as macroblock 205', there are 128×64 different 16×16 comparison regions which can be aligned with the current macroblock 205'. Region 225' in the current picture 200 is co-sited with the search window 225 and is shown for illustrative purposes.

Each 16×16 comparison region is defined by shifting one pixel horizontally or vertically from a previous region. Thus, there is a large overlap between neighboring comparison regions. The comparison region 205 which is located in the same relative position within the overall picture as the current macroblock 205' is said to be co-sited with the current macroblock.

Typically, the position of a current macroblock, or comparison region in a search window, is defined by the upper left-hand coordinate of the macroblock or comparison search region such that the comparison region in the search window 225 which most closely matches the reference macroblock 205' can be defined by a horizontal and vertical displacement, e.g., a motion vector. Specifically, the displacement of the best-match comparison region relative to the current macroblock is (0,0) if the best-match comparison region is co-sited with the current macroblock.

Additionally, positive values of the motion vector components indicate that the best-match comparison region block is to the right of, and below, the current macroblock, or equivalently, the co-sited comparison region. For example, a motion vector of (5,6) indicates that the upper left-hand pixel of the best-match comparison region is five pixels to the right of, and six pixels below, the upper left-hand pixel of the co-sited comparison region or, equivalently, the upper left-hand pixel of the current macroblock. In FIG. 2, a best-match region 210 and motion vector 215 are shown for the current macroblock 205'.

The best match comparison region can be determined according to a linear or second order error function. In particular, for a linear error function, a sum of absolute errors term $D^{(1)}$ is defined conventionally as the sum of the absolute pixel errors $d_{i,j}$ at the ith row and jth column between every corresponding pixel in the current luminance macroblock and the comparison region, e.g., $$D^{(1)} = \sum_{i=1}^{16} \sum_{j=1}^{16} d_{i,j}.$$

For a second order error function, a sum of squared error terms $D^{(2)}$ is define as $$D^{(2)} = \sum_{i=1}^{16} \sum_{j=1}^{16} d_{i,j}^2.$$

Thus, the comparison region which results in the minimum error in a search window is selected as the best match comparison region.

However, determining the error using every pixel in the current macroblock requires that the data for each pixel is retrieved and stored in memory, such as random access memory (RAM), so that it is available for immediate use by a CPU or other computational circuit. Additionally, with real-time processing, the error calculations must be performed within a constrained time limit.

Figure 3:
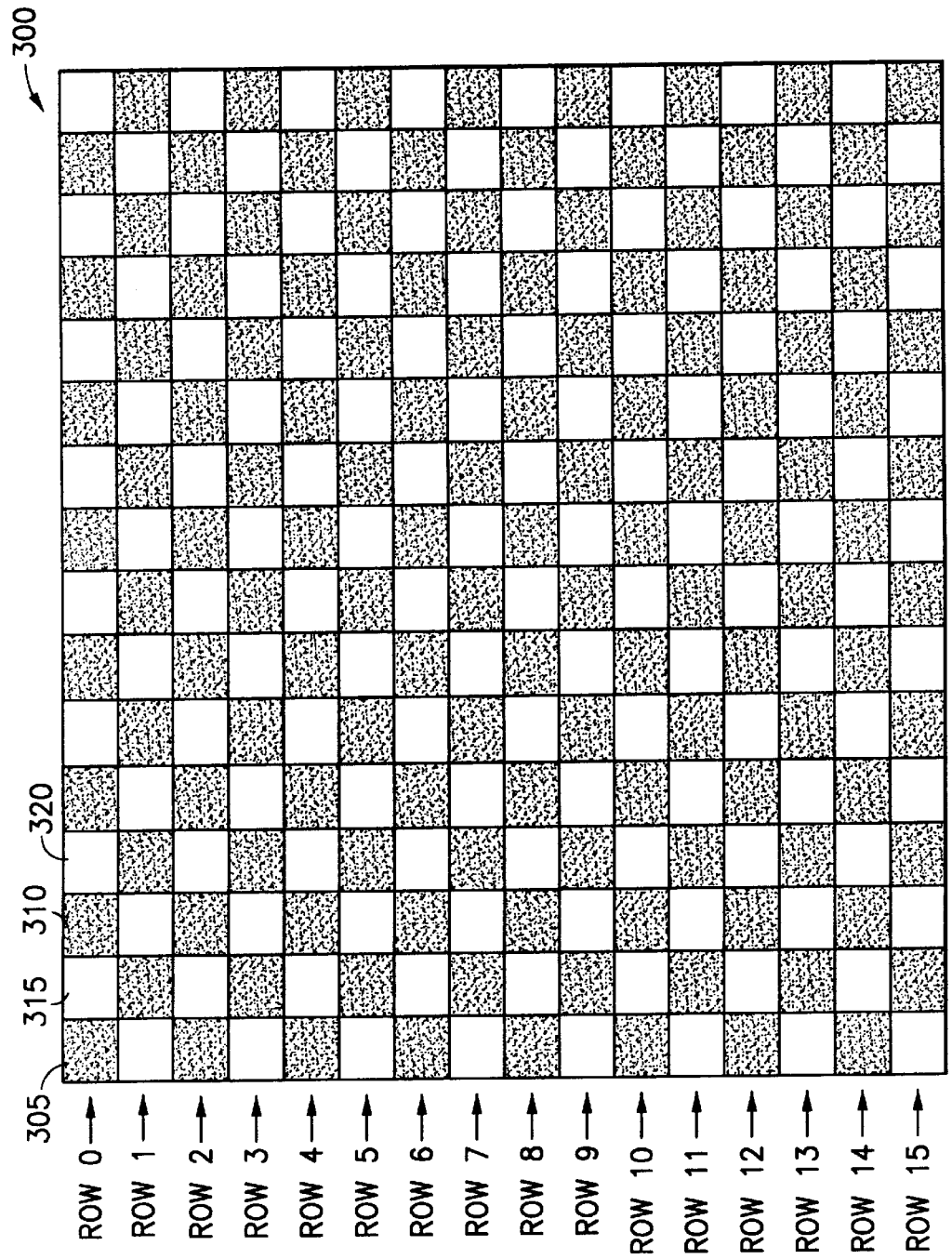
FIG. 3 illustrates a checkerboard pixel pattern for motion estimation with a 50% reduction in the pixel data of the current macroblock in accordance with the present invention.

FIG. 3 illustrates a checkerboard pixel pattern for motion estimation with a 50% reduction in the pixel data of the current macroblock in accordance with the present invention. The current macroblock 300, which may correspond to the macroblock 205' of FIG. 2, is illustrated as a 16×16 luminance macroblock in the present example. However, it should be appreciate that different sized macroblocks or blocks may be used. Alternatively, the image area need not be square or rectangular, but may have an arbitrary shape. In any case, the current image is defined by some bounded region.

Furthermore, the scheme can be adapted for use with chrominance pixel components according to the particular sampling format, e.g., 4:2:0.

A portion of the current macroblock pixel data 300 is retrieved by a motion estimation circuit and stored in memory according to a current image pattern which is designated by the shaded areas. The current macroblock includes rows 0–15. For field mode video, rows 0, 2, 4, 6, 8, 10, 12 and 14 represent a top or even field, while rows 1, 3, 5, 7, 9, 11, 13 and 15 represent a bottom or odd field. For frame mode video, the current macroblock is comprised of the pixel data from each of the shaded areas of rows 0–15.

In accordance with one embodiment of the present invention, only a subset of the pixels in the macroblock are retrieved and used to find a best-match macroblock in the search window. Here, the subset is 50%, or 128 out of 256 pixels. Thus, there is a 50% efficiency improvement. The grid or pattern shown includes shaded regions, such as 305 and 310, which indicate that the correspondingly positioned pixel is retrieved and used for motion estimation. The unshaded regions, such as 315 and 320, indicate that the correspondingly positioned pixel is not retrieved and used for motion estimation.

The pattern shown forms a checkerboard pattern, also known as a quincunx pattern. Every other pixel in the horizontal and vertical directions is selected for use in motion estimation, while the remaining pixels are not selected. In the example shown, the required memory capacity for storing the current macroblock can be reduced by 50%. Generally, with this embodiment, it is necessary to continue to retrieve all pixels in the search window for comparison with the designated current macroblock pixels. This is true since all of the search window pixels typically will be required at one point or another to perform the error calculations as the current macroblock is overlaid with the different comparison regions in the search window.

With the embodiments discussed in connection with FIGS. 12–15, a reduced number of search window pixels may be used with the same motion estimation performance relative to the reduced current macroblock pattern of FIG. 3.

For some patterns, it will be appreciated that some portions of the search window may not be needed for motion compensation. For example, with the diagonal patterns of FIGS. 5–7, the pixel data of the upper right-most and lower left-most triangular portions of the search window are not used for motion compensation and therefore need not be retrieved.

The selected current macroblock pattern should not noticeably reduce the quality of the coded image. As discussed in greater detail below, the seemingly disparate goals of reduced memory storage and computational requirements, together with the maintenance of satisfactory image quality in the coded image, can be achieved.

For frame mode video, the sum of absolute errors (SAE) term $D^{(1)}$ is defined for the embodiment of FIG. 3 as $$D^{(1)} = \sum_{i=1}^{8} \sum_{j=1}^{8} d_{2i-1,2j-1} + \sum_{i=1}^{8} \sum_{j=1}^{8} d_{2i,2j}.$$

For both frame and field motion estimation, the error terms $D_{top\ field}$ and $D_{bottom\ field}$, respectively, for the top and bottom field motion vectors, are $$D^{(1)}_{top\ field} = \sum_{i=1}^{8} \sum_{j=1}^{8} d_{2i-1,2j-1}, \text{ and}$$

$$D^{(1)}_{bottom\ field} = \sum_{i=1}^{8} \sum_{j=1}^{8} d_{2i,2j}.$$

Figure 4:
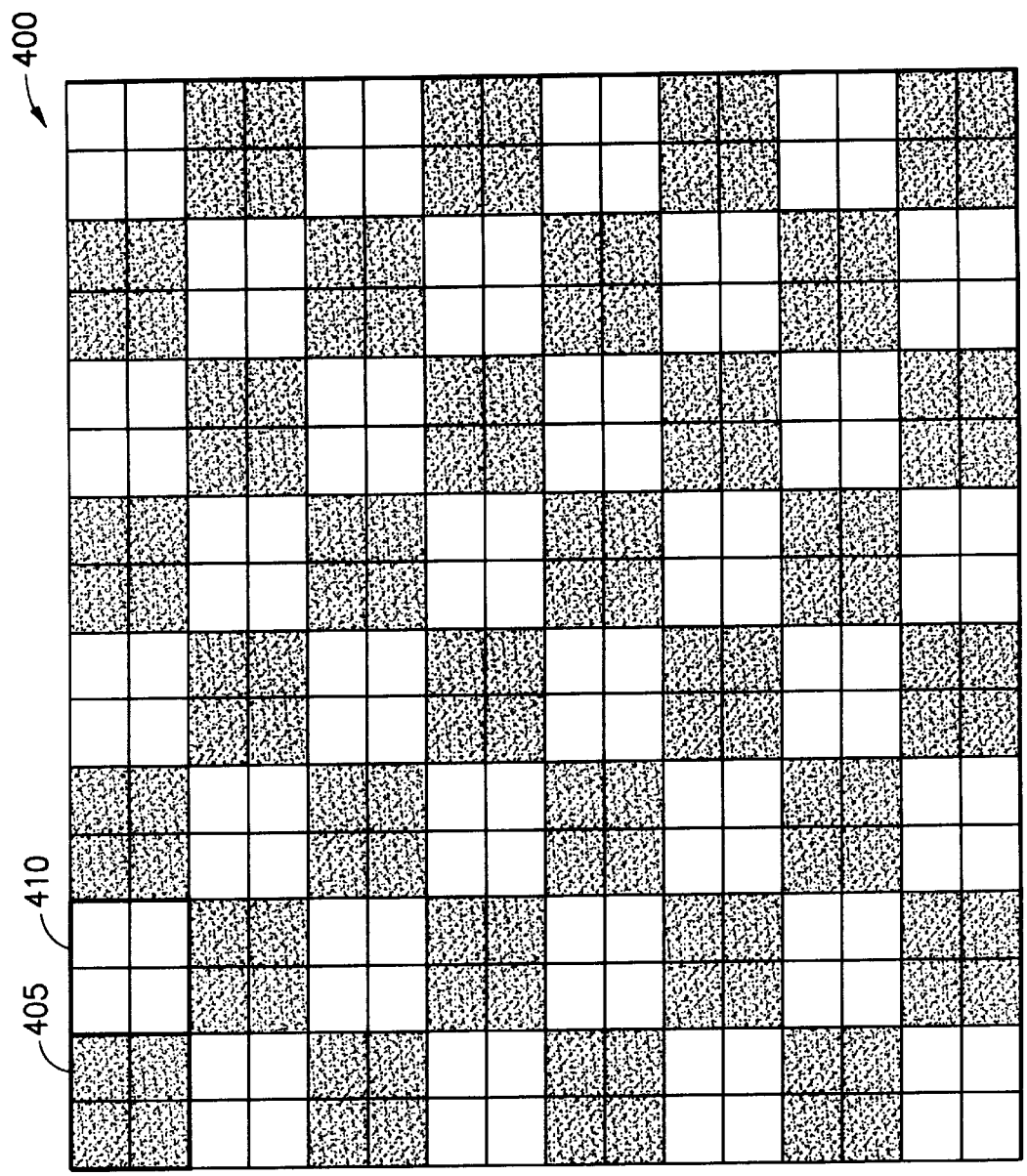
FIG. 4 illustrates an alternative checkerboard pixel pattern for motion estimation with a 50% reduction in the pixel data of the current macroblock in accordance with the present invention.

FIG. 4 illustrates an alternative checkerboard pixel pattern for motion estimation with a 50% reduction in the pixel data of the current macroblock in accordance with the present invention. Here, there is also a 50% improvement since only one-half of the pixels in the current macroblock 400 are used for motion estimation. However, groups of four neighboring (e.g., contiguous) pixels are used. The designated pixels of the current macroblock 400 are shown by the shaded regions, such as a region 405, which indicates that the corresponding four pixels are retrieved and used for motion estimation. The unshaded regions, such as region 410, includes four pixels which are not used in motion compensation. The pattern repeats in the horizontal and vertical directions.

Figure 5:
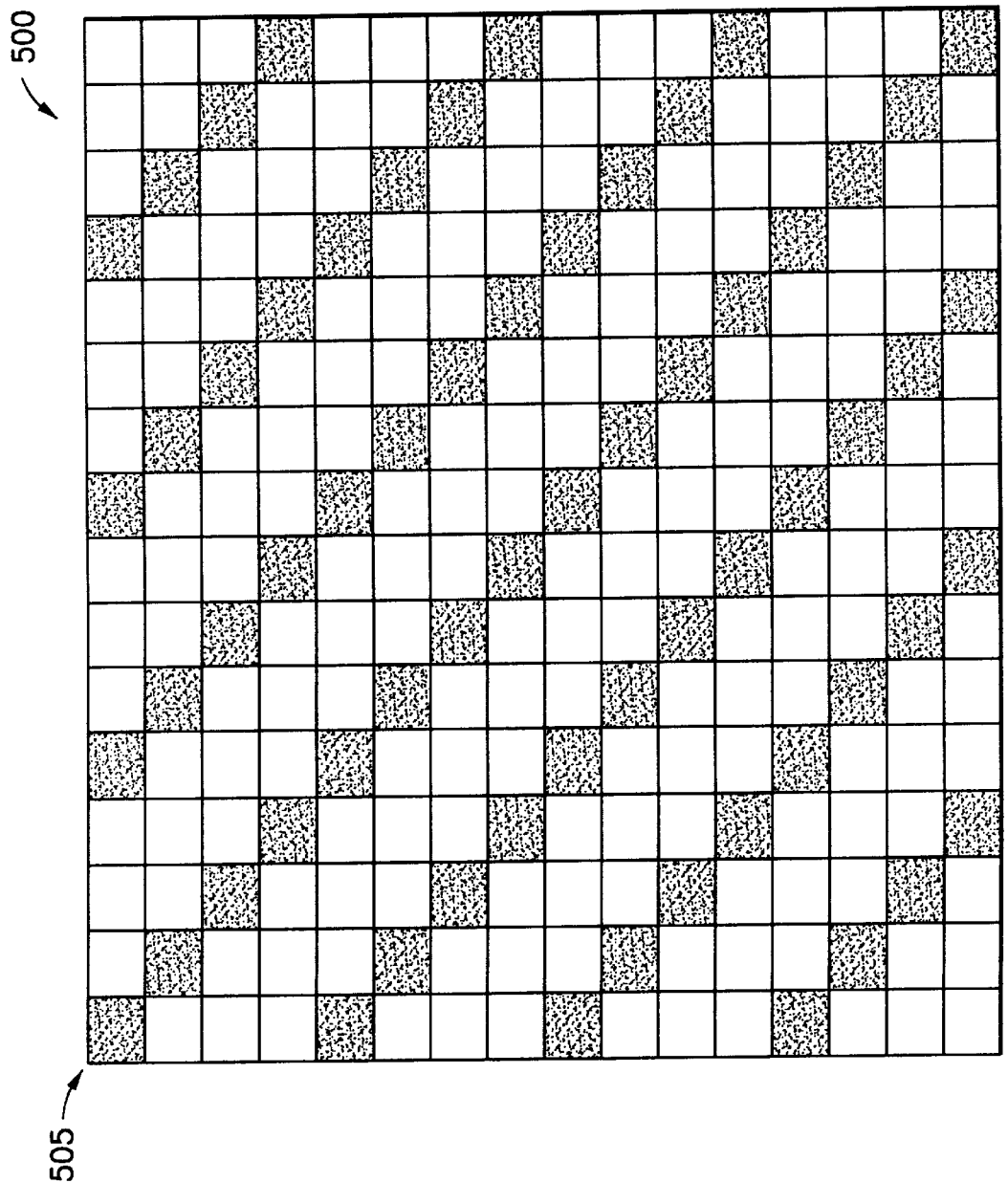
FIG. 5 illustrates a diagonal pixel pattern for motion estimation with a 75% reduction in the pixel data of the current macroblock in accordance with the present invention.

FIG. 5 illustrates a diagonal pixel pattern for motion estimation with a 75% reduction in the pixel data of the current macroblock in accordance with the present invention. Here, there is also a 75% efficiency improvement since only one-quarter of the pixels in the current macroblock 500 are used for motion estimation (e.g., 64 out of 256). The designated pixels of the current macroblock 500 are shown by shaded diagonal regions, such as a region 505 which includes sixteen pixels. The unshaded regions designate pixel locations of the current macroblock which are not used in motion compensation and therefore need not be retrieved.

Generally, diagonal patterns effectively detect motion which is horizontal, vertical, or diagonal in the direction of the diagonal, but may not effectively detect motion which is perpendicular to the diagonal.

Figure 6:
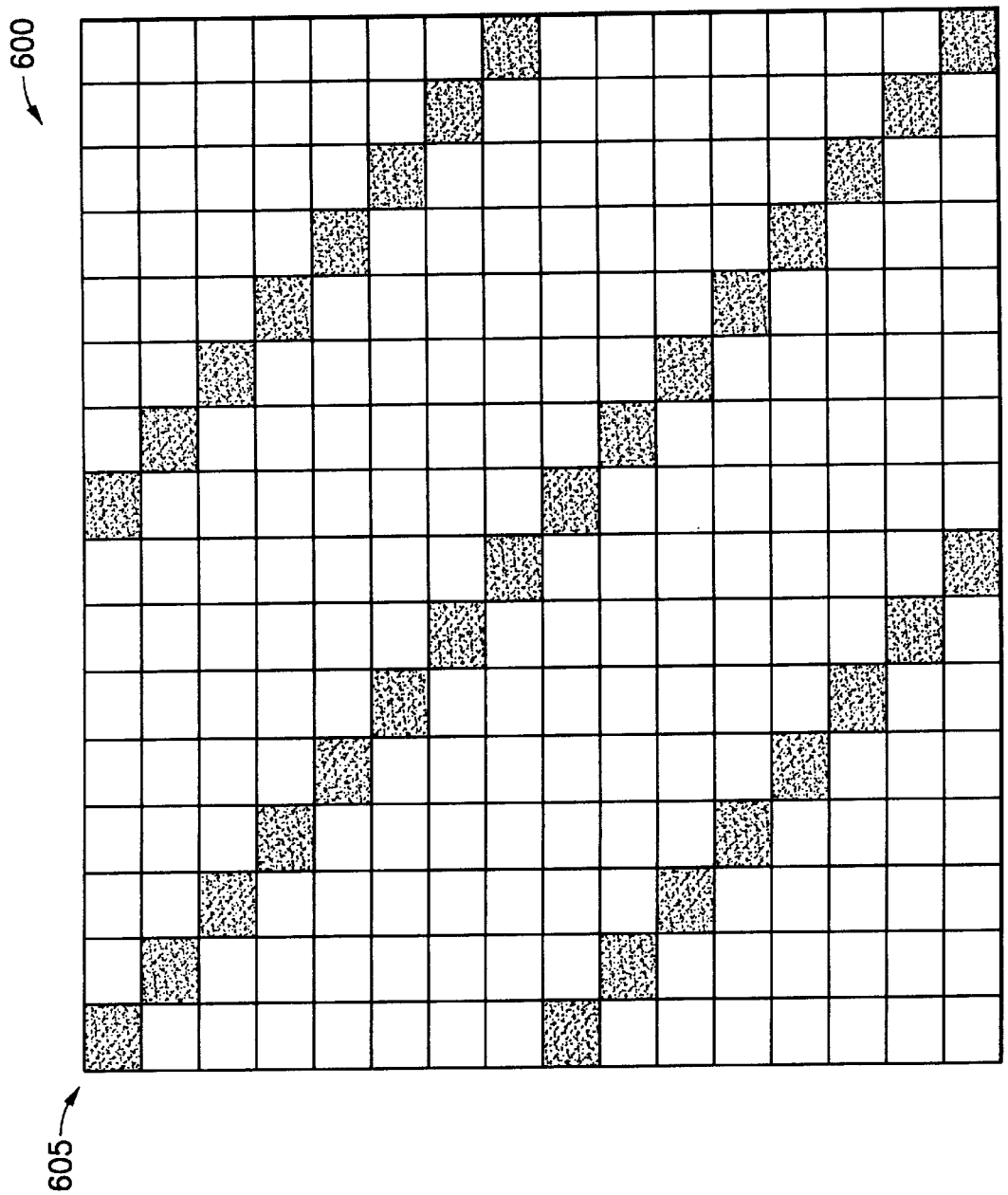
FIG. 6 illustrates another diagonal pixel pattern for motion estimation with an 87.5% reduction in the pixel data of the current macroblock in accordance with the present invention.

FIG. 6 illustrates another diagonal pixel pattern for motion estimation with an 87.5% reduction in the pixel data of the current macroblock in accordance with the present invention. Here, there is an 87.5% improvement since only one-eighth of the pixels in the current macroblock 600 are used for motion estimation (e.g., 32 out of 256). The designated pixels of the current macroblock 600 are shown by shaded diagonal regions, such as a region 605 which includes sixteen pixels. The unshaded regions designate pixel locations of the current macroblock which are not used in motion compensation.

Figure 7:
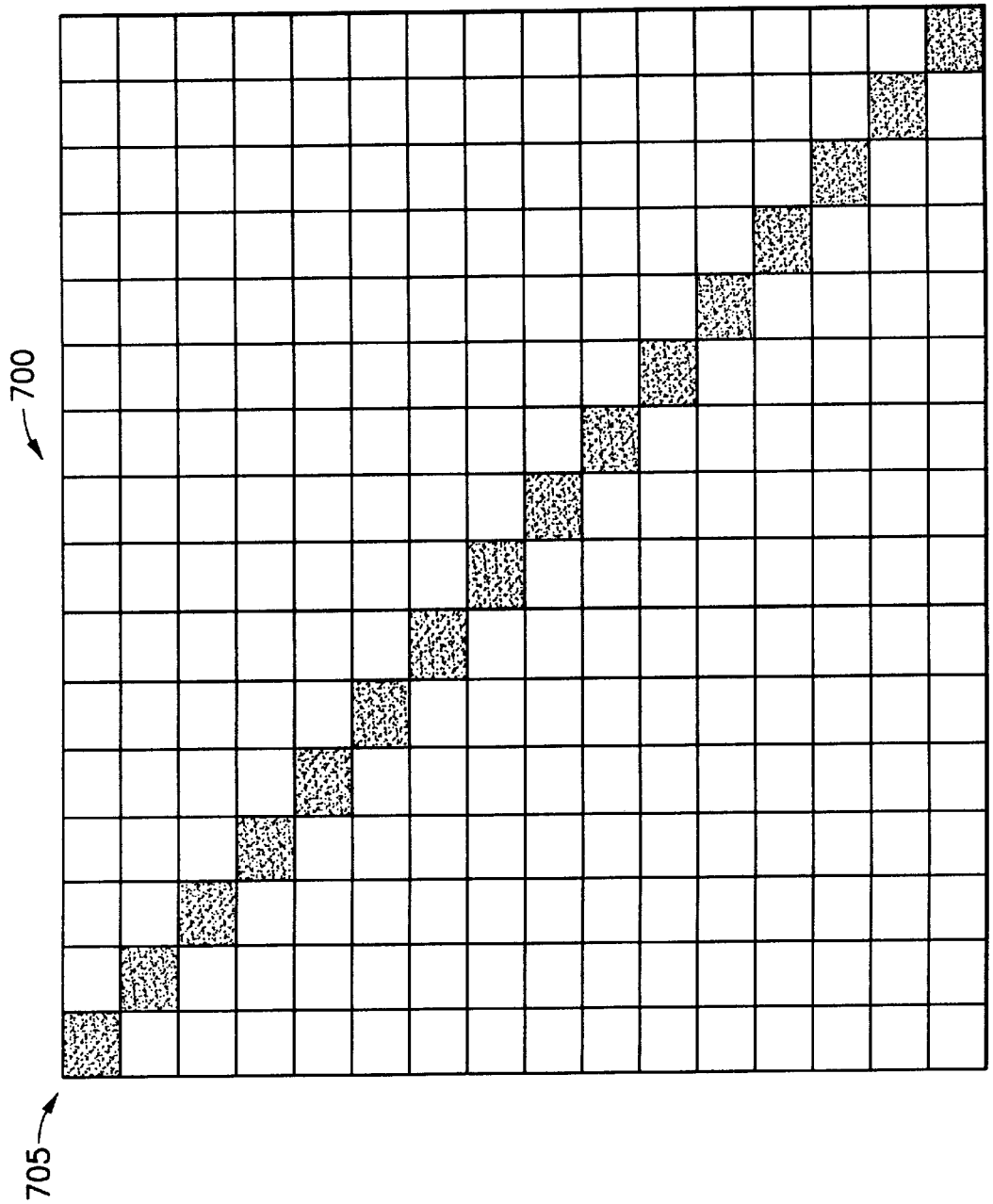
FIG. 7 illustrates yet another diagonal pixel pattern for motion estimation with an 93.75% reduction in the pixel data of the current macroblock in accordance with the present invention.

FIG. 7 illustrates yet another diagonal pixel pattern for motion estimation with an 93.75% reduction in the pixel data of the current macroblock in accordance with the present invention. Here, there is a 93.75% improvement since only one-sixteenth of the pixels in the current macroblock 700 are used for motion estimation (e.g., 16 out of 256). The designated pixels of the current macroblock 700 are shown by a shaded diagonal region 705 which includes sixteen pixels. The unshaded regions designate pixel locations of the current macroblock which are not used in motion compensation.

It will be appreciated that, with the diagonal patterns of FIGS. 5–7, it is possible to alter the pattern so the diagonals run from the lower left to the upper right of the current macroblock. Furthermore, a grid pattern with vertical and horizontal lines may be used. Additionally, the diagonal or horizontal and vertical lines may have a thickness of two or more pixels rather than a single pixel.

For example, with the diamond pattern of FIG. 7, the pixel data of the upper right-most and lower left-most triangular portions of the search window are not used for motion compensation and therefore need not be retrieved. This can result in a memory capacity savings of 240 pixels (e.g., 256–16).

Figure 8:
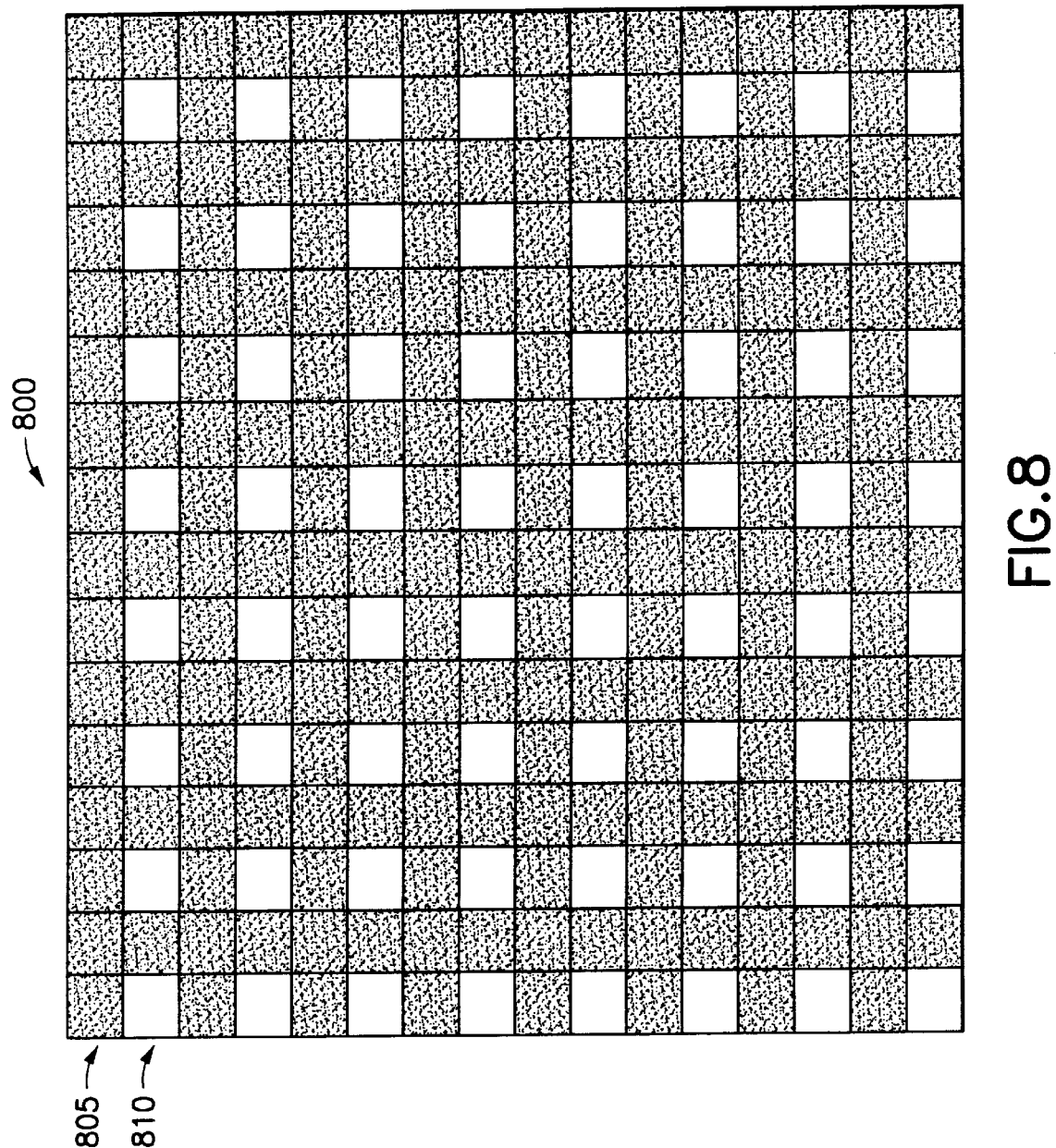
FIG. 8 illustrates a pixel pattern for motion estimation with a 25% reduction in the pixel data of the current macroblock in accordance with the present invention.

FIG. 8 illustrates a pixel pattern for motion estimation with a 25% reduction in the pixel data of the current macroblock in accordance with the present invention. Here, all of the pixels in alternating horizontal rows are used for motion compensation, while half of the pixels in the remaining rows are used. A total of 192 out of 256 available pixels in the current macroblock are used, resulting in an efficiency improvement of 25%. For example, in the macroblock 800, all pixels in a first row 805 are used for motion compensation, while in a second row 810, only every other pixel is used. Generally, horizontal motion is more probable than vertical motion in video motion sequences.

For example, in a sequence of a football game, the football may move horizontally across the video frame. Furthermore, a moving vertical edge of the object (e.g., football) is likely to extend over the distance of several pixels in order to be visible to the viewer. Therefore, to track the vertical edge of an object which is moving horizontally in a video sequence, it is desirable to use successive horizontally neighboring pixels for motion estimation. The pattern disclosed achieves the desired objective while still reducing computational and memory storage requirements.

Figure 9:
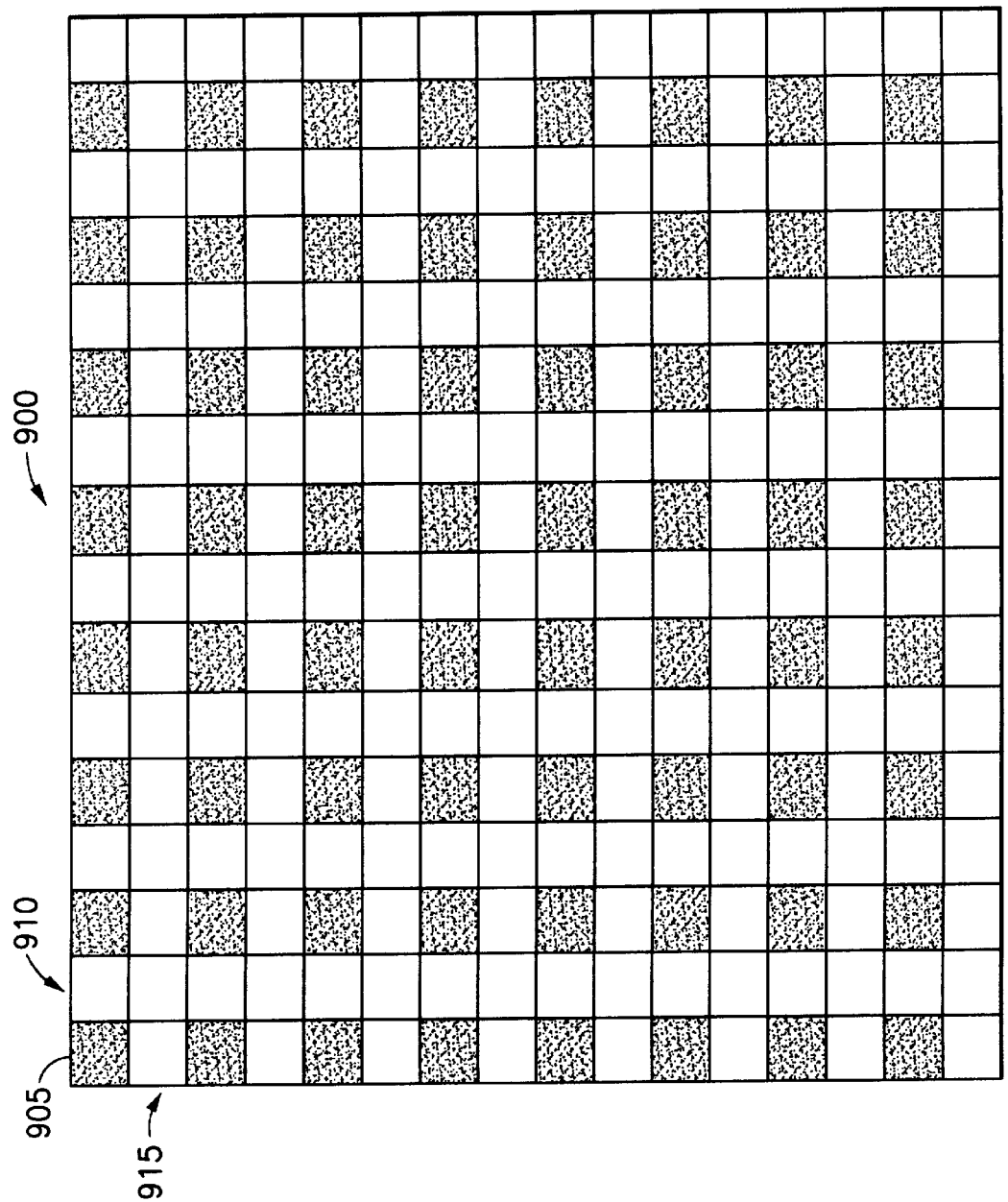
FIG. 9 illustrates a horizontally and vertically symmetrical sparse pixel pattern for motion estimation with a 75% reduction in the pixel data of the current macroblock in accordance with the present invention.

FIG. 9 illustrates a horizontally and vertically symmetrical sparse pixel pattern for motion estimation with a 75% reduction in the pixel data of the current macroblock in accordance with the present invention. The current macroblock 900 uses every other pixel in the horizontal and vertical directions for motion estimation, such as pixel 905. Rows and columns of pixels, such as row 915 and column 910 are not used. The designated pixels are symmetrically spaced horizontally and vertically in the current macroblock 900.

Figure 10:
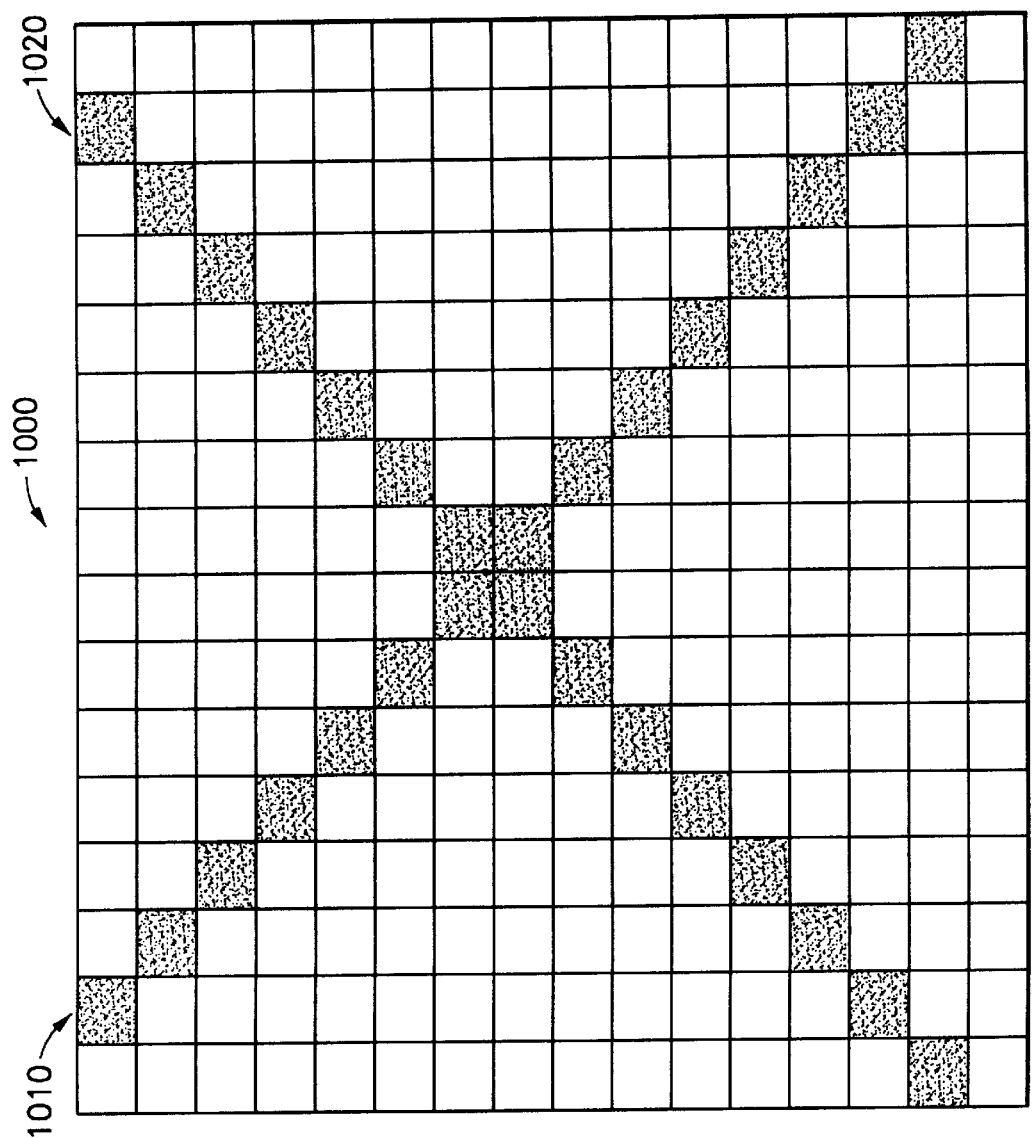
FIG. 10 illustrates an X shaped pixel pattern for motion estimation with an 88.3% reduction in the pixel data of the current macroblock in accordance with the present invention.

FIG. 10 illustrates an X shaped pixel pattern for motion estimation with an 88.3% reduction in the pixel data of the current macroblock 1000 in accordance with the present invention. Thirty of the 256 pixels are used for motion compensation according to the "X" pattern shown. The pattern is formed by diagonal lines 1010 and 1020. Generally, an "X" pattern effectively detects motion in all directions.

Figure 11:
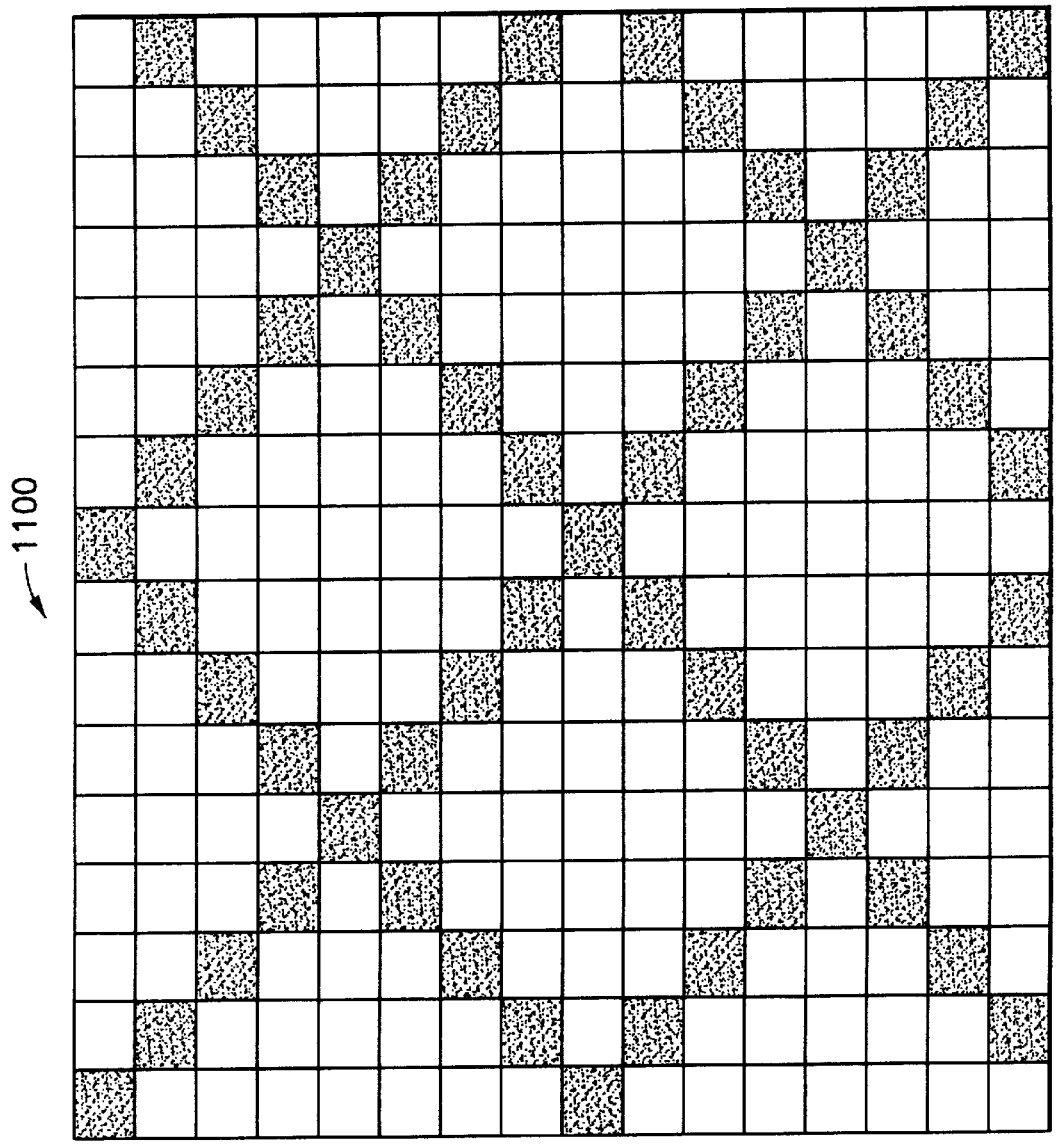
FIG. 11 illustrates a diamond shaped pattern for motion estimation with a 78.1% reduction in the pixel data of the current macroblock in accordance with the present invention.

FIG. 11 illustrates a diamond shaped pattern for motion estimation with a 78.1% reduction in the pixel data of the current macroblock 1100 in accordance with the present invention. In the diamond pattern shown, fifty-six of the 256 pixels are used for motion compensation. Other diamond patterns may be formed by varying the size of each diamond. Moreover, a current macroblock may have just one diamond.

Figure 12:
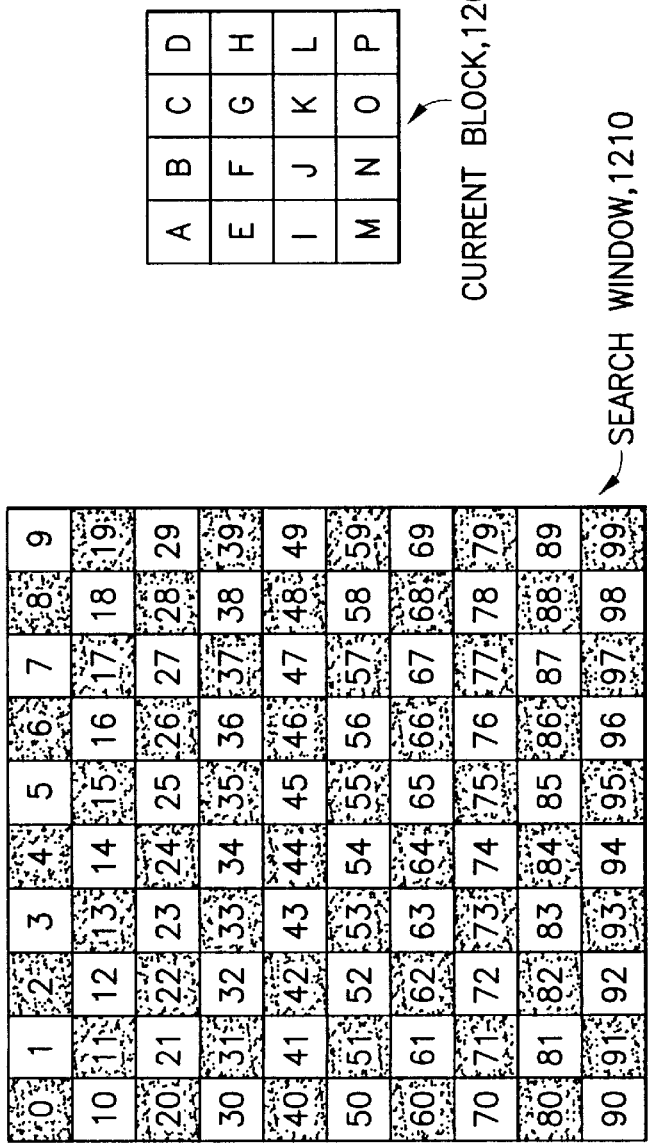
FIG. 12 illustrates a pixel pattern for motion estimation with a 50% reduction in the pixel data of the search window in accordance with the present invention.

FIG. 12 illustrates a pixel pattern for motion estimation with a 50% reduction in the pixel data of the search window in accordance with the present invention. In accordance with another embodiment of the present invention, the required pixel data in the search window rather than the current macroblock is reduced. For simplicity, a search window 1210 is shown as having one hundred pixel positions, numbered from 0–99, but only the shaded positions are required for motion estimation. Thus, only fifty pixels are required, resulting in a 50% savings in memory and computations. These required pixels are numbered 0, 2, 4, 6, 8, 11, 13, 15, 17, 19, 20, 22, 24, 26, 28, 31, 33, 35, 37, 39, 40, 42, 44, 46, 48, 51, 53, 55, 57, 59, 60, 62, 64, 66, 68, 71, 73, 75, 77, 79, 80, 82, 84, 86, 88, 91, 93, 95, 97 and 99.

Generally, a 50% savings in memory for the search window is larger in absolute terms (e.g., megabytes) than a 50% saving in memory for a current macroblock since the search window is significantly larger than a macroblock, for example, by a factor of eight or sixteen.

Additionally, a current block 1200 is illustrated for simplicity as having 4×4 pixels, with pixel positions labeled from A–P. In practice, 16×16 macroblocks are used for the current image, and a larger search window is used, e.g., 128×64.

Figure 13:
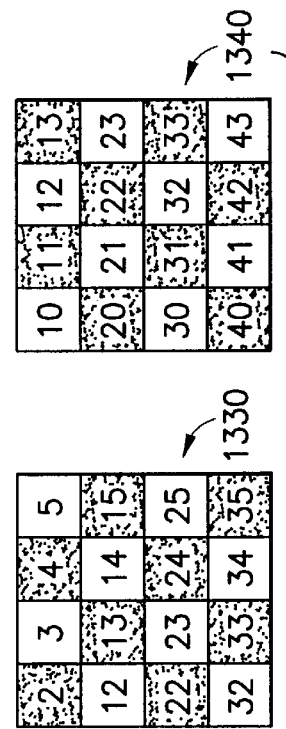
FIG. 13 illustrates motion estimation with the pixel pattern of FIG. 12.

FIG. 13 illustrates motion estimation with the pixel pattern of FIG. 12. With motion estimation, the pixel data of a current block is compared to successive comparison positions of the search window to determine which comparison position most closely matches the current block. In a first comparison position 1310, the current block is overlaid with a 4×4 region at the upper left-hand corner of the search window to calculate the block error.

However, only one-half of the pixel data in the current block is compared to corresponding pixels in the comparison region 1310 in calculating the block error. Specifically, in a first step, pixel "A" in the current block 1200 is compared to pixel "O" in the comparison region, pixel "C" is compared to pixel "2", pixel "F" is compared to pixel "11", pixel "H" is compared to pixel "13", pixel "I" is compared to pixel "20", pixel "K" is compared to pixel "22", pixel "N" is compared to pixel "31", and pixel "P" is compared to pixel "33".

A sum of errors term can therefore be calculated, as discussed previously, for the first comparison region 1310.

Next, in a second step, the current block 1200 is shifted one pixel to the right in the search window 1210 for comparison with a region 1320. Here, six of the search window pixels which were used in the first comparison region 1310 are used again, with the addition of two other pixels, "4" and "24". However, the current block pixels which are used are the ones which were not used in the previous comparison. Specifically, pixel "B" is compared to pixel "2", pixel "D" is compared to pixel "4", pixel "E" is compared to pixel "11", pixel "G" is compared to pixel "13", pixel "J" is compared to pixel "22", pixel "L" is compared to pixel "24", and pixel "M" is compared to pixel "31", and pixel "O" is compared to pixel "33".

In a third step, the current block is again shifted one pixel to the right for comparison with a region 1330. The same current macroblock pixels are used for the third step as were used in the first step with the region 1310. Moreover, six of the same search window pixels are used with the addition of two new pixels, namely "15" and "35".

Specifically, pixel "A" is compared to pixel "2", pixel "C" is compared to pixel "4", pixel "F" is compared to pixel "13", pixel "H" is compared to pixel "15", pixel "I" is compared to pixel "22", pixel "K" is compared to pixel "24", pixel "N" is compared to pixel "33", and pixel "P" is compared to pixel "35".

In a subsequent example step, the current block is again shifted for comparison with a region 1340. The same current macroblock pixels are used in the fourth step as were used in the second step with the region 1320. Specifically, pixel "B" is compared to pixel "11", pixel "D" is compared to pixel "13", pixel "E", is compared to pixel "20", pixel "G" is compared to pixel "22", pixel "J" is compared to pixel "31", pixel "L" is compared to pixel "33", and pixel "M" is compared to pixel "40", and pixel "O" is compared to pixel "42".

The process continues until an error has been determined for each of the comparison positions in the search window. The comparison position which yields the smallest error is selected as a best match region and designated by a motion vector. Thus, the search window pixels are fixed, while the pattern of pixels of the current block which are used in motion estimation alternates between two different patterns. The two patterns may be inverse image checkerboard patterns; that is, the first pattern is the negative of the second pattern, and the second pattern is the negative of the first pattern.

Figures 14, 15:
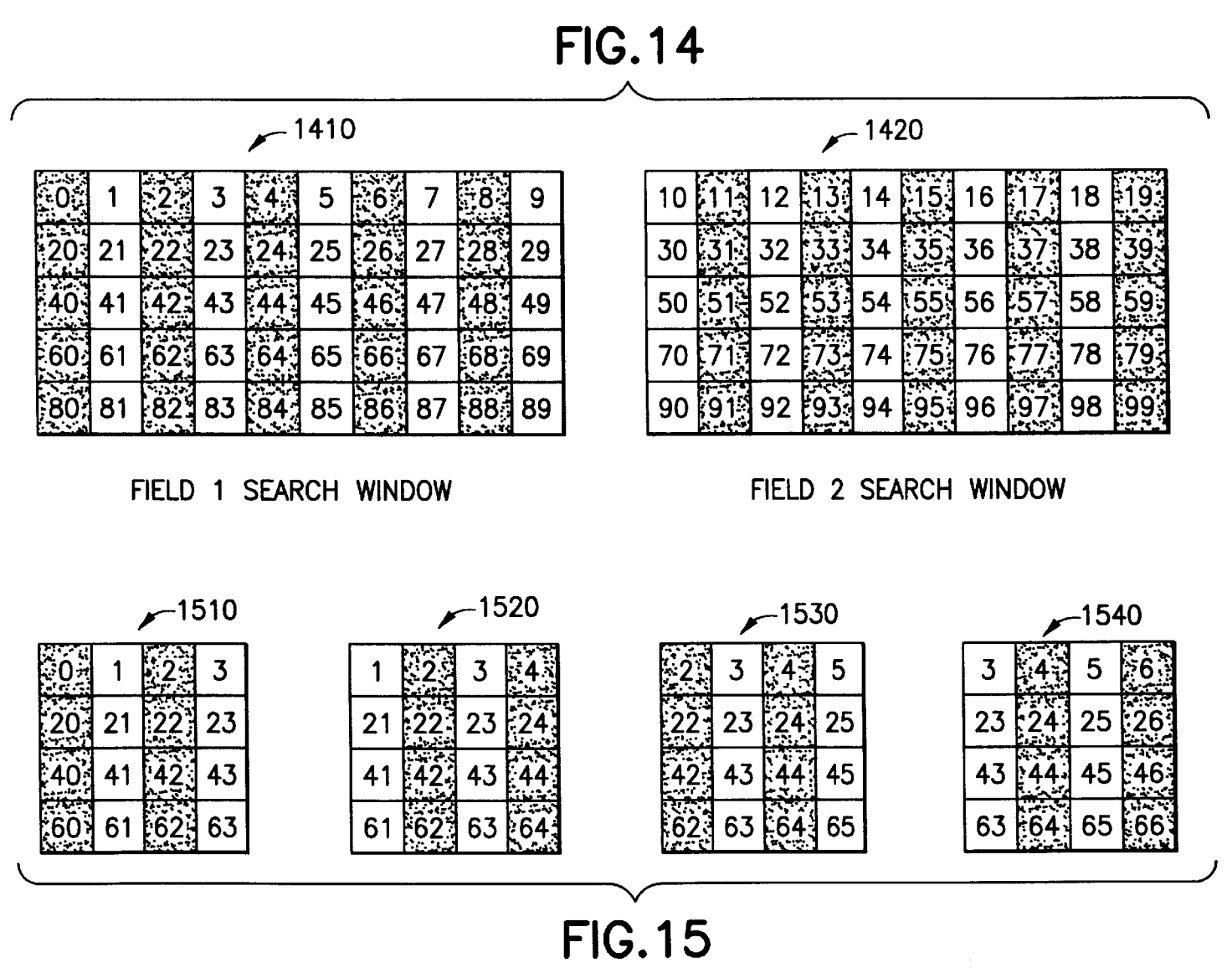

FIG. 14 illustrates motion estimation for field mode video in accordance with the present invention. The search process described in connection with FIGS. 12 and 13 can be used for either frame or field searches, but not both. In a video coding system where both frame and field searches are required, such as the adaptive frame/field coding scheme disclosed in the MPEG-2 video standard, one search window may be shared, but each field search window will occupy every other line of the entire search window.

For example, a field 1 search window (e.g., top field) 1410 includes pixels from alternate rows of the search window 1210 of FIG. 12, namely pixels numbered 0, 2, 4, 6, 8, 20, 22, 24, 26, 28, 40, 42, 44, 46, 48, 60, 62, 64, 66, 68, 80, 82, 84, 86 and 88. Similarly, a field 2 search window (e.g., bottom field) 1420 includes pixels from the remaining alternate rows of the search window 1210, namely pixels numbered 11, 13, 15, 17, 19, 31, 33, 35, 37, 39, 51, 53, 55, 57, 59, 71, 73, 75, 77, 79, 91, 93, 95, 97 and 99.

FIG. 15 illustrates motion estimation with the pixel pattern of FIG. 14. Analogous to the discussion in connection with FIG. 13, an error is calculated for the current block 1200 relative to comparison regions 1510, 1520, 1530 and 1540. For comparison region 1510, pixel "A" is compared to pixel "0", pixel "C" is compared to pixel "12", pixel "E" is compared to pixel "20", pixel "G" is compared to pixel "22", pixel "I" is compared to pixel "40", pixel "K" is compared to pixel "42", pixel "M" is compared to pixel "60", and pixel "O" is compared to pixel "62." Thus, the pattern of search window pixels used for the first field of the current block is vertical lines rather than a checkerboard.

The current block is then shifted one pixel to the right to determine the error for comparison region 1520. Pixel "B" is compared to pixel "2", pixel "D" is compared to pixel "4", pixel "F" is compared to pixel "22", pixel "H" is compared to pixel "24", pixel "J" is compared to pixel "42", pixel "L" is compared to pixel "44", pixel "N" is compared to pixel "62", and pixel "P" is compared to pixel "64."

The current block is again shifted one pixel to the right for comparison region 1530. Pixel "A" is compared to pixel "2", pixel "C" is compared to pixel "4", pixel "E" is compared to pixel "22", pixel "G" is compared to pixel "24", pixel "I" is compared to pixel "42", pixel "K" is compared to pixel "44", pixel "M" is compared to pixel "62", and pixel "O" is compared to pixel "64."

The current block is once again shifted one pixel to the right for comparison region 1540. Pixel "B" is compared to pixel "4", pixel "D" is compared to pixel "6", pixel "F" is compared to pixel "24", pixel "H" is compared to pixel "26", pixel "J" is compared to pixel "44", pixel "L" is compared to pixel "46", pixel "N" is compared to pixel "64", and pixel "P" is compared to pixel "66."

The appropriate comparisons for the field 2 search window 1420 can be determined in an analogous manner.

Table 1 below verifies the effectiveness of the present invention in reducing computational and memory requirements while maintaining a satisfactory image quality. Seven video test sequences with 704×480 pixel resolution were coded using the macroblock patterns of FIG. 3 (Case 1), FIG. 5 (Case 2), FIG. 6 (Case 3), and FIG. 7 (Case 4). With the exception of "circular zoneplate", the video sequences are described in Test Model Editing Committee, "Test Model 5", ISO/IEC JTC1/SC29/WG11 MPEG93/457, April 1993. Test results for the embodiment wherein a reduced number of pixels in the search window are used as discussed in connection with FIG. 12, are expected to correspond to Case 1.

All sequences were coded at 4 Mbits/second using the same motion search range, which is [±63.5H,±31.5V] for P-frames and [±31.5H,±31.5V] for B-frames. Three important statistics are shown. The first statistic is the Peak Signal-to-Noise Ratio (PSNR) of the luminance component of the coded images. The difference in PSNR compared to the reference full search motion estimation scheme is indicated.

The second statistic is the Sum of Absolute Error (SAE) of the full pel displaced 16×16 luminance macroblock (mb), averaged over all motion vectors. The third statistic is the percentage of suboptimal motion vectors, which are defined as the motion vectors that yield a higher SAE than the reference full search motion estimation scheme.

The first four sequences are typical MPEG test sequences, namely flower-garden, cheer-leader, bus, and mobile-calendar. In the simulations, forty-three frames of each sequence were coded. The fifth sequence is forty-nine frames of a computer generated moving circular zoneplate, the luminance value of which at frame coordinates (x,y) of the nth field is generated by $$I(x, y, n) = 128 + 112 \cdot \sin\left(2\pi\left(\frac{r^2}{1920} + \frac{n}{30}\right)\right),$$

where r is the distance of the pixel from the center of the zoneplate, which is given by $$r = \sqrt{(x - 352)^2 + (y - 240)^2}.$$

The chroma values of the images are kept constant at 128.

This test pattern consists of a continuum of frequency that ranges from DC (at the center where r=0) to the highest resolvable frequency of a 480 line interlaced display (at the top and bottom of the images). The speed of motion is two sinusoidal cycles per second.

The last two test sequences are artificially composed by adding zero-mean Gaussian noise to the flower-garden and cheer-leader sequences. The variance of the Gaussian noise is 16. The first column of data in the table are generated by a reference full search motion estimation scheme in which all 256 displaced frame difference values of a 16×16 luminance block are used to evaluate the error function.

For the two-level hierarchical motion estimation scheme, the search range is [±64H,±32V] for P frames and [±32H, ±32V] for B frames. The top level image is decimated by two to yield a search range of [±32H,±16V] for P-frames and [±16H,±16V] for B-frames, while the search range at the bottom level is [±2.5H,±2.5V] for both P-frames and B-frames. A 1-7-7-1 filter is used in the decimation of images to construct separate field and frame pyramids for the hierarchical search scheme.

Cases 2–4 further reduce the computational complexity of the error function by a factor of 2, 4, or 8, respectively, relative to Case 1. No filtering was applied in the simulations. As shown, Case 1 clearly outperforms a two-level hierarchical search motion estimation scheme. The two-level hierarchical search scheme incurred a moderate PSNR loss of approximately 0.3 to 0.4 dB for typical images, and a smaller loss of 0.1 to 0.2 dB for noisy images. However, the hierarchical search scheme did not cope well with the abundant high frequency content of the zoneplate, resulting in a PSNR loss in excess of 1.6 dB. Compared to the reference coded images, slight degradation was seen on the images coded with the hierarchical search scheme. The degradation is more pronounced in the zoneplate where a significant increase in "dirtiness" was observed in the picture.

With Case 1, the loss in PSNR for all sequences is well below 0.1 dB, except for the bus sequence, which incurred a 0.19 dB loss. Visually, the Case 1 coded images are virtually indistinguishable from the reference coded images in all test cases, except for the bus sequence in which very slight degradation was noticed. Note that the hierarchical search scheme subsamples both the search window and the reference template at the top level, whereas the Case 1 motion estimator subsamples only the reference template and maintains a full resolution search window. This accounts for the superior performance of Case 1 on high frequency content.

Modifying Case 1 to further reduce the sampling density trades compression efficiency with the complexity of the motion estimator. As indicated by the simulation results for Cases 2–4, the error function can be reduced to the summation of sixty-four or thirty-two absolute differences at the expense of only a small penalty in performance, e.g., less than 0.4 dB. However, with Case 4, the performance degrades to a level which may be unacceptable when the number of terms in the summation is reduced to sixteen absolute differences.

Note that the Case 2 and 3 patterns generated more suboptimal motion vectors than the hierarchical search scheme, yet the average full pel errors are smaller and the PSNR values are higher. This observation suggests that the hierarchical motion estimation algorithm tends to incur bigger error when it is trapped in a suboptimal situation.

TABLE 1

| Video Sequence | Statistics | Reference | Hierarchical search | Case 1 (FIG. 3) | Case 2 (FIG. 5) | Case 3 (FIG. 6) | Case 4 (FIG. 7) |
|---|---|---|---|---|---|---|---|
| flower-garden | PSNR of Luma (dB) | 29.94 | −0.31 | −0.01 | −0.02 | −0.09 | −0.52 |
| | Avg. full pel SAE/mb | 1639 | 1816 | 1644 | 1658 | 1705 | 1957 |
| | % of suboptimal vectors | 0 | 18.9 | 15.3 | 24.9 | 34.8 | 49.0 |
| cheerleaders | PSNR of Luma (dB) | 29.22 | −0.27 | −0.01 | −0.03 | −0.14 | −0.66 |
| | Avg. full pel SAE/mb | 2263 | 2451 | 2272 | 2295 | 2425 | 2991 |
| | % of suboptimal vectors | NA | 23.2 | 19.2 | 30.8 | 44.8 | 60.1 |
| bus | PSNR of Luma (dB) | 31.38 | −0.42 | −0.19 | −0.23 | −0.38 | −1.04 |
| | Avg. full pel SAE/mb | 1536 | 1654 | 1543 | 1560 | 1615 | 1878 |
| | % of suboptimal vectors | 0 | 24.7 | 15.5 | 26.7 | 38.4 | 57.0 |
| mobile-calendar | PSNR of Luma (dB) | 27.68 | −0.31 | −0.02 | −0.07 | −0.06 | −1.37 |
| | Avg. full pel SAE/mb | 1756 | 1890 | 1767 | 1787 | 1870 | 2419 |
| | % of suboptimal vectors | 0 | 14.1 | 10.5 | 17.2 | 27.6 | 48.2 |
| circular zoneplate | PSNR of Luma (dB) | 28.66 | −1.65 | −0.03 | −0.03 | −0.13 | −8.66 |
| | Avg. full pel SAE/mb | 1554 | 2266 | 1558 | 1565 | 1601 | 5643 |
| | % of suboptimal vectors | 0 | 72.7 | 4.0 | 5.6 | 11.3 | 89.9 |
| flower garden with noise | PSNR of Luma (dB) | 28.63 | −0.22 | −0.02 | −0.05 | −0.15 | −0.64 |
| | Avg. full pel SAE/mb | 2141 | 2312 | 2155 | 2181 | 2249 | 2591 |
| | % of suboptimal vectors | 0 | 25.8 | 25.6 | 35.7 | 46.0 | 60.9 |
| cheerleader with noise | PSNR of Luma (dB) | 28.26 | −0.10 | −0.01 | −0.03 | −0.20 | −1.01 |
| | Avg. full pel SAE/mb | 2725 | 2898 | 2744 | 2781 | 2939 | 3611 |
| | % of suboptimal vectors | 0 | 25.2 | 29.4 | 43.0 | 59.0 | 76.45 |

Accordingly, it can be seen that the present invention provides a method and apparatus for efficient motion estimation of a digital video image wherein memory capacity and processing requirements are reduced by 50% or more. In one embodiment, only a portion of the pixel data for a current macroblock is required to perform motion estimation. A portion of the current macroblock is retrieved for motion compensation according to a current image pattern, which may be a checkerboard pattern, a diagonal pattern, an X pattern or a diamond pattern, for example. The pattern may be biased for horizontal motion.

For some patterns, it may be possible to avoid retrieving pixel data for certain corner and/or edge regions of the search region. This results in further memory capacity reductions in addition to the reductions already achieved by avoiding the retrieval of many of the current image pixels.

In another embodiment, only a portion of the pixel data of a search window is required to perform motion estimation. A search window pattern may comprise a fixed checkerboard pattern while the current image pattern is alternated between first and second inverse checkerboard patterns for successive comparison regions of the search window.

The scheme is compatible with frame or field mode video sequences.

Although the invention has been described in connection with various specific embodiments, those skilled in the art will appreciate that numerous adaptations and modifications may be made thereto without departing from the spirit and scope of the invention as set forth in the claims.

For example, the invention is suitable for both rectangular and arbitrarily shaped image areas, such as video object planes (VOPs) defined in the MPEG-4 standard.

Additionally, a video picture can be divided into two or more regions, where a different motion estimation pattern is used in each region. For example, if it is known before the motion estimation is performed that a specific type of video sequence has relatively little motion in a particular portion of a picture, e.g., at the perimeter of the picture, a pattern with higher efficiency can be used near the perimeter of the picture. For example, a 50% reduction in the current macroblock pixels can be realized in a central region of the picture, while a 75% reduction is realized near the perimeter. However, the memory must be sized for the worst case, e.g., for the 50% reduction case.

Moreover, for simplicity, the selection of the different regions should account for the size of the search window which is used so that the macroblock pattern does not change within a given search window.

Furthermore, in any embodiment, the frame efficiency improvement can be fixed, or it can be varied, for example, on a frame by frame basis, under the control of a user input signal or other criteria.

What is claimed is:

1. A method for performing motion estimation of a current video image using a search window of another video image, said current video image having a first defined number of pixels, and said search window encompassing a search region which can accommodate a second defined number of pixels, at most, comprising the steps of:

retrieving a reduced number of pixels from said search region to form said search window according to a search window pattern, said reduced number being less than said second defined number; and comparing a reduced number of pixels of said current video image which is less than said first defined number to different comparison regions of said search window according to a current image pattern to obtain corresponding error values; wherein:

said current image pattern corresponds to said search window pattern;

said current image pattern is alternated between first and second patterns for successive comparison regions while said search window pattern is fixed;

said second pattern is an inverse image of said first pattern;

said first pattern correlates with a first comparison region of said search window and alternate comparison regions thereafter; and said second pattern correlates with a second comparison region in said search window which immediately follows said first comparison region, and alternate comparison regions thereafter.

2. The method of claim 1, comprising the further step of:

defining a motion vector for said current video image according to said error values.

3. The method of claim 1, wherein:

said search window pattern and first and second patterns comprise respective checkerboard patterns.

4. The method of claim 1, wherein:

the first comparison region and the alternate comparison regions thereof extend horizontally in said search window.

5. The method of claim 1, wherein:

the first comparison region and the alternate comparison regions thereof extend vertically in said search window.

6. An apparatus for performing motion estimation of a current video image using a search window of another video image, said current video image having a first defined number of pixels, and said search window encompassing a search region which can accommodate a second defined number of pixels, at most, comprising:

means for retrieving a reduced number of pixels from said search region to form said search window according to a search window pattern, said reduced number being less than said second defined number; and means for comparing a reduced number of pixels of said current video image which is less than said first defined number to different comparison regions of said search window according to a current image pattern to obtain corresponding error values;

wherein:

said current image pattern corresponds to said search window pattern;

said current image pattern is alternated between first and second patterns for successive comparison regions while said search window pattern is fixed;

said second pattern is an inverse image of said first pattern;

said first pattern correlates with a first comparison region of said search window and alternate comparison regions thereafter; and said second pattern correlates with a second comparison region in said search window which immediately follows said first comparison region, and alternate comparison regions thereafter.

7. The apparatus of claim 6, further comprising:

means for defining a motion vector for said current video image according to said error values.

8. The apparatus of claim 6, wherein:

said search window pattern and first and second patterns comprise respective checkerboard patterns.

9. The apparatus of claim 6, wherein:

the first comparison region and the alternate comparison regions thereof extend horizontally in said search window.

10. The apparatus of claim 6, wherein:

the first comparison region and the alternate comparison regions thereof extend vertically in said search window.

11. A method for performing motion estimation of a current video image using a search window of another video image, said current video image having a first defined number of pixels, and said search window encompassing a search region which can accommodate a second defined number of pixels, at most, comprising the steps of:

retrieving a reduced number of pixels from said search region to form said search window according to a search window pattern, said reduced number being less than said second defined number; and comparing a reduced number of pixels of said current video image which is less than said first defined number to different comparison regions of said search window according to a current image pattern to obtain corresponding error values;

wherein:

said current image pattern corresponds to said search window pattern; and said current video image comprises a field mode image with first and second fields;

forming the search window for said first field using alternate rows of said search window pattern; and forming the search window for said second field using alternate rows of said search window pattern which are different than said alternate rows for said first field.

12. The method of claim 11, wherein:

said search window pattern comprises a fixed checkerboard pattern while said current image pattern comprises a checkerboard pattern which is alternated between first and second checkerboard patterns for successive comparison regions;

said second checkerboard pattern is an inverse image of said first checkerboard pattern; and said search window for said first field comprises columns of pixels.

13. An apparatus for performing motion estimation of a current video image using a search window of another video image, said current video image having a first defined number of pixels, and said search window encompassing a search region which can accommodate a second defined number of pixels, at most, comprising:

means for retrieving a reduced number of pixels from said search region to form said search window according to a search window pattern, said reduced number being less than said second defined number; and means for comparing a reduced number of pixels of said current video image which is less than said first defined number to different comparison regions of said search window according to a current image pattern to obtain corresponding error values;

wherein:

said current image pattern corresponds to said search window pattern; and said current video image comprises a field mode image with first and second fields;

means for forming the search window for said first field using alternate rows of said search window pattern; and means for forming the search window for said second field using alternate rows of said search window pattern which are different than said alternate rows for said first field.

14. The apparatus of claim 13, wherein:

said search window pattern comprises a fixed checkerboard pattern while said current image pattern comprises a checkerboard pattern which is alternated between first and second checkerboard patterns for successive comparison regions;

said second checkerboard pattern is an inverse image of said first checkerboard pattern; and said search window for said first field comprises columns of pixels.

\* \* \* \* \*